Dec. 12, 1961  A. BUISSON ET AL  3,012,524
CAR FOR SHIPPING ROAD VEHICLES BY RAIL
Filed Dec. 11, 1957  3 Sheets-Sheet 1
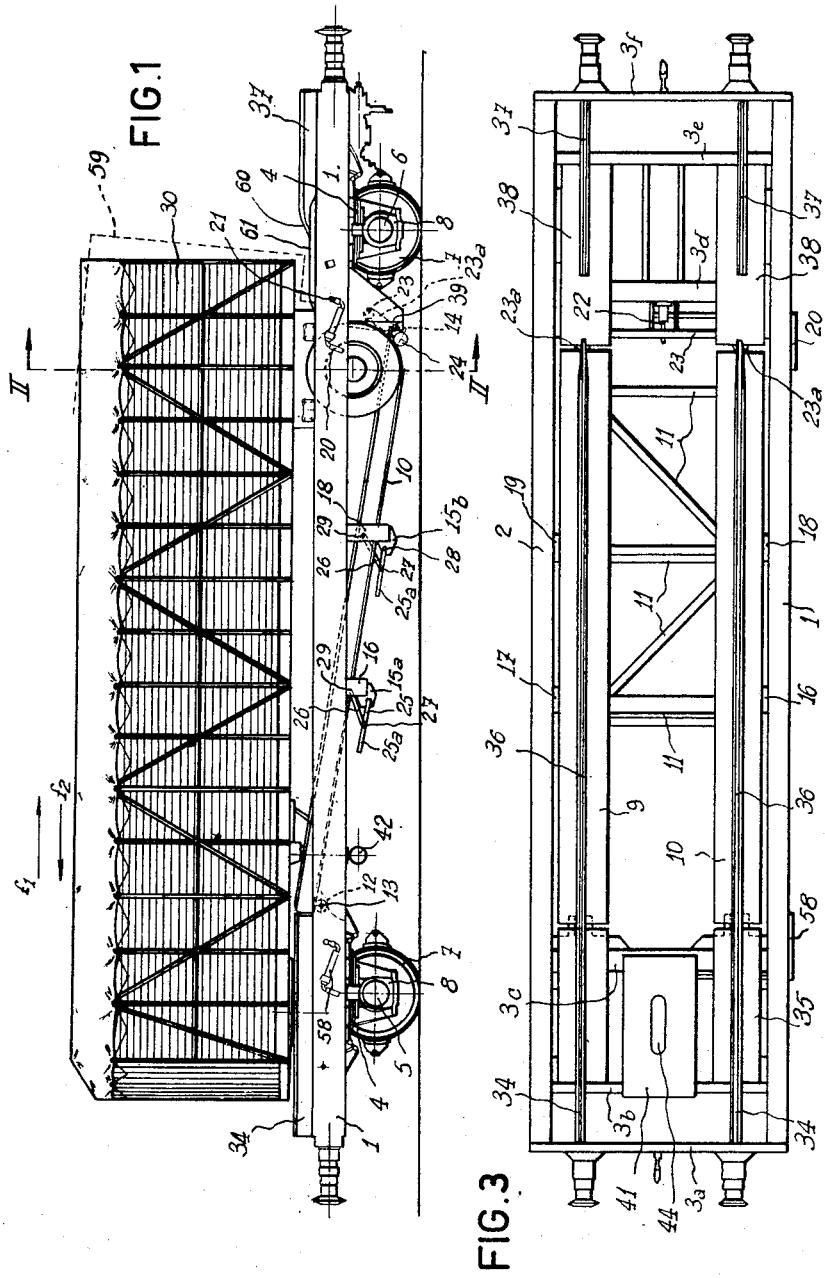
Inventors
André Buisson
Gustave Noyon
By their attorneys
Howson and Howson.

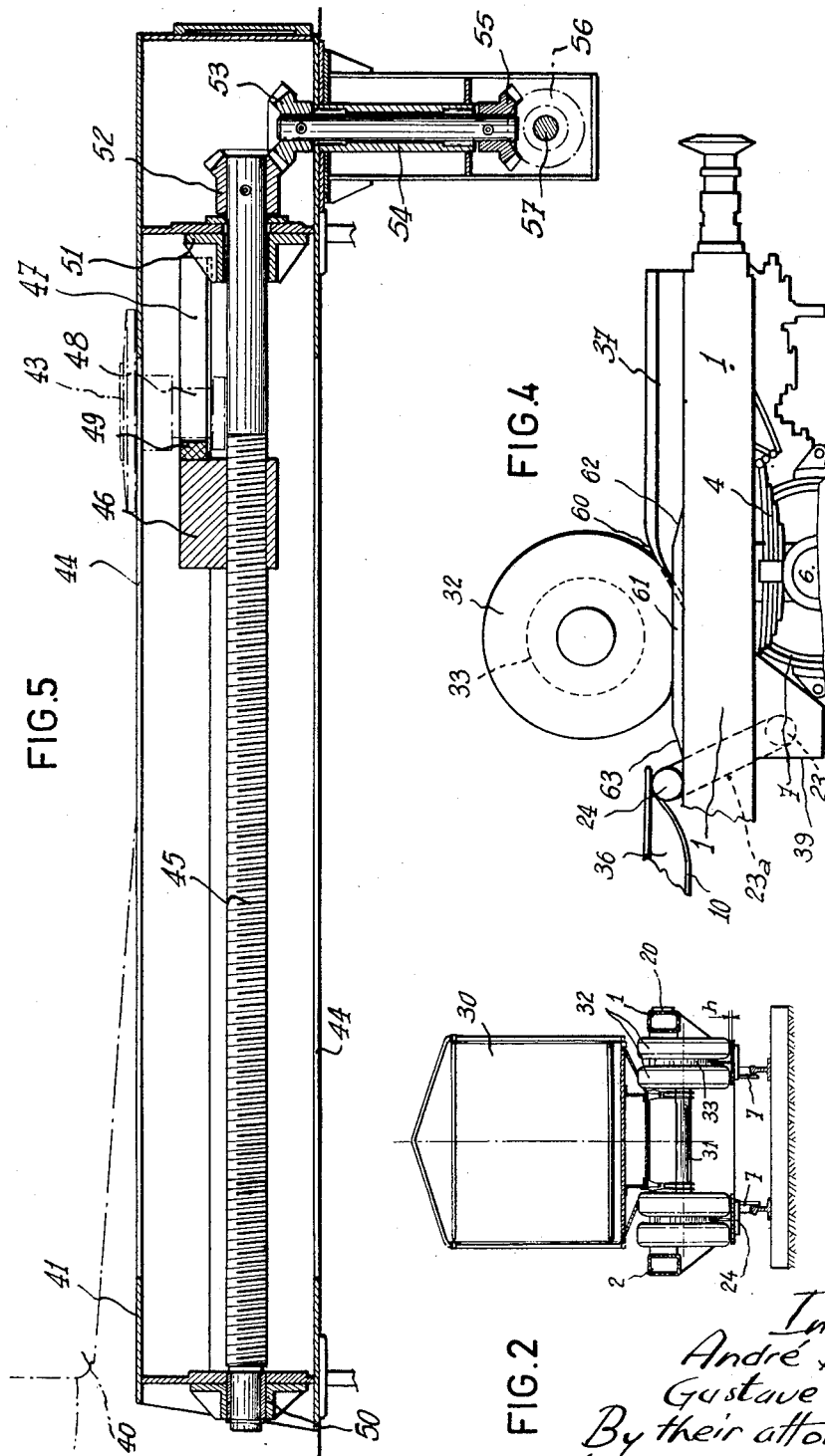

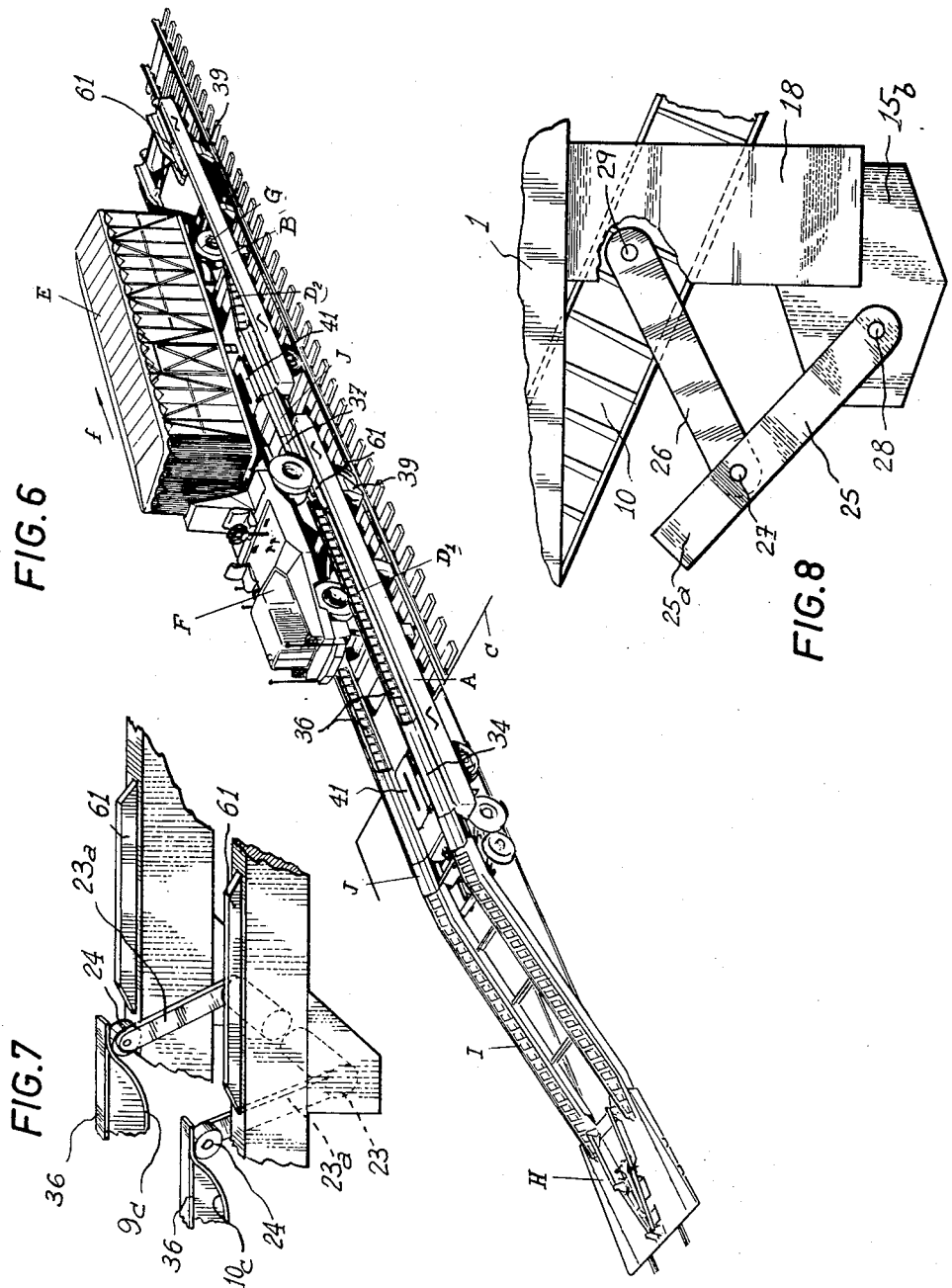

ns the United States Patent Office
3,012,524
Patented Dec. 12, 1961

3,012,524
CAR FOR SHIPPING ROAD VEHICLES BY RAIL
André Buisson and Gustave Noyon, Paris, France, assignors to Societe Lorraine des Anciens Etablissements de Dietrich & Co., de Luneville, Paris, France, a company of France
Filed Dec. 11, 1957, Ser. No. 702,071
Claims priority, application France Dec. 15, 1956
5 Claims. (Cl. 105—368)

This invention relates to railroad cars or trucks and it is the main object of the invention to provide an improved flat car construction especially designed for facilitating the shipment by rail of heavy-duty road vehicles having a single rear axle, specifically semi-trailers.

Semi-trailers generally comprise a body with a flat bottom at a relatively high elevation, supported at its rear end upon a rear axle and set of wheels, with the wheels and tires positioned completely beneath the bottom of the trailer body. The forward end of the body is adapted to be supported by way of a bearing surface or saddle upon a cooperating bearing surface at the rear end of the tractor, or upon a prop when uncoupled from the tractor. The portion under the high-slung trailer body or platform and in front of the rear axle represents a considerable waste of capacity which greatly restricts the useful freight capacity of the trailer. However, the vertical dimension of the trailer body cannot be extended over the maximum gauge limits imposed by rail and road traffic regulations respectively. In this respect it is generally the gauge limit imposed by railway regulations when the trailer is carried on a flat car which provides the more severe limitation on the height impartable to a trailer.

In order to overcome this limitation it has been proposed that railroad cars for the shipment of semi-trailers be provided wherein the car platform is formed with a vertically movable section in at least that portion thereof which supports the axle of the semi-trailer, which movable section is adapted to be retracted beneath the general platform level between the axles of the railway car. The semi-trailer is then loaded on the car and the movable section in its raised position provides a track over which the semi-trailer can be continuously driven and guided to its desired position on the car. When the semi-trailer has been properly positioned in longitudinally centered position on the car, the movable section is lowered whereby the axle of the semi-trailer is retracted under the car platform and the bottom of the semi-trailer body rests practically flush with the floor of the platform.

The known form of flat car just described substantially reduces the limitations imposed on the vertical dimensions of semi-trailer vehicles by railroad regulations as will be readily appreciated, since it now becomes possible to increase the vertical dimension of a semi-trailer by an amount substantially corresponding to the vertical extent of the wheels while still remaining within the permissible maximum gauge provided such a semi-trailer is shipped on a railway car of the type described. Thus the useful freight capacity of semi-trailers can be substantially increased as is also, incidentally, that of the railway car itself.

However, the car construction just described possesses a number of rather serious drawbacks. First, since the sequence of operations in unloading the vehicle from the car corresponds, in reverse, to the loading sequence, it will be apparent that each car must be equipped with apparatus for elevating the movable platform section in order to raise it back to its normal floor level before the vehicle can be drawn away. The elevating equipment thus provided must be powerful enough to raise the semi-trailer and the freight contained in the latter, i.e. must be able to handle loads of about ten to twenty tons. Such power equipment considerably increases the cost of construction and maintenance of the railway car and is difficult to operate.

In another connection, when the movable platform section in a car of the kind specified above is lowered while remaining constantly parallel to the horizontal plane, means must be provided for blocking the vehicle against longitudinal movements and for damping such movements especially during impacts between cars, and such devices have to be provided both in the areas adjacent to the axle of the vehicle and adjacent to the forward end of it. Such devices for which numerous patents have been issued are relatively complicated and hence objectionable.

Furthermore, it should be noted that the commercial feasibility of the operation of railway rolling stock depends for a given freight directly on the ratio between operating time and idle time, so that the reduction of the idling periods involved in loading and unloading operations is a prime objective of railway shipping companies. Raising the movable platform and adjusting the blocking and shock-absorbing devices are lengthy operations especially since the setting of the latter devices may have been affected by shocks received from the vehicle during the loading process and a resetting is thus required. Finally the vehicles often are inadequately guided axially of the car during loading so that they are not infrequently derailed thereby further complicating matters considerably.

An object of this invention is to provide a railroad car or truck construction especially designed for the transportation of semi-trailers and similar road vehicles, whereby loading and unloading operations will practically be reduced to moving the semi-trailer on and off the car.

Another object is to provide such a truck or car wherein the longitudinal positioning and blocking of the shipped vehicle will automatically be assured by the vehicle itself.

A further object is to achieve an automatic protection of parts of the truck or car and shipped vehicle against longitudinal and transverse impacts and to damp or cushion said impacts.

Yet another object is to provide a comparatively low-cost and low-weight car or truck construction of the type described, which need not be provided with elevator equipment incorporated in the car, since the vehicles loaded on such cars are adapted to be raised out of their retracted condition on the car by means of a separate tractor which can be provided as common service equipment assigned to a particular railway station or depot.

Essentially the invention comprises equipping a railway truck or flat car with a swinging frame adapted in a raised condition to provide a continuous riding track longitudinally of the car and adapted to be lowered into an opening or recess formed in the platform between the car axles for receiving the rear set of wheels of a semi-trailer or similar vehicle, which frame when in its lowered position is adapted to provide an incline providing a continuous track for said vehicle from the bottom of said opening to one end of the car.

In case the railway car is subjected to a longitudinal impact the kinetic energy of the relative movement between the car and the vehicle carried thereon will be effectively absorbed and dissipated in one direction by a yielding of the tires of the vehicle against a wall of the opening remote from the pivotal axis of the swinging frame, and in the other direction by the vehicle riding a short distance up the incline. The vehicle can be both eased into the opening and raised out of the opening over the incline by being coupled to a tractor which is operated to retard the downward movement of the vehicle or to pull the vehicle up the incline, as the case may be. Hence, the swinging frame only need be moved between its positions when carrying no load, so that no power equipment need be provided on the car for this purpose. Furthermore no particular centering adjustment of the vehicle in the opening is required of the kind found necessary in conventional systems of the kind described, since the vehicle tends of its own accord to be positioned at a lowermost position within the opening and therefore, all that is necessary is that the car structure be so designed in view of the particular vehicle with which it is to be used that the loads are properly centered in said lowermost position.

The above and further objects, advantages and features of the invention will appear more clearly from the ensuing particular description relating to one exemplary embodiment thereof as illustrated in the accompanying drawings wherein:

FIG. 1 is a side elevational view of a flat goods truck or flatcar constructed in accordance with the invention, a semi-trailer vehicle being shown in position thereon;

FIG. 2 is a cross section on line II—II of FIG. 1;

FIG. 3 is an overhead plan view of the car with the vehicle removed and the swinging frame in raised condition;

FIG. 4 is a side view on an enlarged scale illustrating means for providing a continuous track between the end of the incline and the adjacent end of the flat car;

FIG. 5 is a large-scale axial section illustrating part of the car structure adjacent to the coupling end of the trailer;

FIG. 6 is a general perspective view illustrating the procedure for loading a semi-trailer on an improved railway car according to the invention;

FIG. 7 is a detail view in perspective of the means at the free end of the platform for swinging it between its raised and lowered positions;

FIG. 8 is an enlarged fragmentary detail view of the means for guiding the swing frame laterally during its upward and downward movements.

As shown a flat goods truck or flat-car essentially comprises a platform including a pair of side sills or members 1 and 2 and cross members or bolsters 3a to 3f interconnecting said side sills near the opposite ends thereof. The platform is supported by way of springs 4 upon a pair of spaced axles 5 and 6 carrying the wheels 7 and supported in conventional journal boxes 8.

As appears clearly from FIG. 3 a large-sized rectangular cut-out or opening is formed in the platform intermediate the side sills 1 and 2 and bolsters 3c and 3d, the ends of said rectangular opening extending in each direction lengthwise somewhat short of the axles 5 and 6. A swinging frame or platform of generally rectangular form corresponding to, but somewhat smaller in size than, said opening, comprises a pair of side members 9 and 10 rigidly interconnected by cross members 11. Formed at one end, the left end as shown, of the side members 9 and 10 are depending flanges 12 formed with openings journalled on a horizontal transverse shaft 13 extending across the frame of the platform, so that the swinging frame can be swung up and down within the opening. Means are provided for blocking the swinging frame in a raised and a lowered end position. In the raised position the right hand end of the swinging frame is blocked by abutment means later described in detail whereby the surface of the swinging frame is then generally coplanar with the surrounding surface of the car platform. The side members 9 and 10 support longitudinal tracks to be later described, over which a semi-trailer can be driven continuously from one to the other end of the car platform in the raised condition of the frame. In the lowered condition of the swinging frame its right hand end rests upon brackets 14 projecting from the main frame of the car. Furthermore in this lowered position intermediate portions of the side members 9 and 10 are supported on intermediate cross members 15a and 15b secured across the lower ends of depending arms 16—17 and 18—19 projecting from the side sills 1 and 2.

Means are provided for swinging the swinging platform between its raised and lowered positions. Such means may comprise a shaft 23 journalled in transverse bearings of the car frame and carrying a pair of spaced lever arms 23a secured thereto. (See FIG. 7 in which, however, the hereinafter-mentioned reducer gearing mechanism 22 has been omitted from its position at the center of the shaft 23.) Rollers 24 journalled at the ends of arms 23a cooperate with arcuate cam surfaces 9c, 10c formed on the under sides of the end portions of side members 9 and 10 to cam the swing frame from its lowered to its raised position and to control the movement of said frame in the downward direction. The shaft 23 is operated through reducer gearing mechanism schematically indicated at 22 (FIG. 3) by means of a manual crank 20 on the side of the car. Preferably the shaft of crank 20 is provided with a folding joint 21 whereby the crank when not in use can be swung to a retracted position along the side of the car as shown in FIGS. 1 and 2. The arrangement is such that in the raised position of the swinging frame (see FIG. 4) the lever arms 23a are normal to the arcuate cam surfaces on the undersides of side members 9 and 10 so as to provide irreversible abutment means therefor positively preventing the swinging frame from dropping into its lowered position (FIG. 1) under its own weight.

Means are provided for guiding the swing frame laterally during its upward and downward movements and for reducing flexion thereof under load when raised. Such means comprise a pair of linkages each comprising a pair of arms 25 and 26 interpivoted at 27, arm 25 having one end 28 pivoted to a related one of the lower cross members 15a and 15b, and arm 26 having an end pivoted at 29 to a side member 10 of the swing frame. Projecting portions 25a of the arms 25 serve to limit the angle between the arms 25 and 26 in the extended condition of the linkages in the raised position of the swinging frame.

Rail means are provided for guiding the vehicle over the full extent of the car. The rail means are provided in three separate track sections including, as clearly shown in FIG. 3, a short initial section 34 secured on base plates 35 supported on the side members 3b, 3c of the car frame, and intermediate section 36 provided on the side members 9 and 10 of the swinging frame, and a short end section 37 secured on further base plates 38 supported across the cross members 3d, 3e on the far side of the car frame. Preferably the rails 34, 36, 37 are arranged to support the semi-trailer vehicle in a manner now to be described with particular reference to FIG. 2. The wheel assembly of the semi-trailer comprises spaced pairs of twin wheels 32 on a common axle 31, with the two wheels in each twin pair being separated by a spacer drum 33. These spacer drums 33 are arranged to ride the rails 34, 36 and 37 in the raised condition of the swinging frame, with said rails being imprisoned between the tires of the adjacent wheels thereby providing a positive guiding action preventing derailment of the semi-trailer.

In the lowered condtion of the swinging frame, similarly, the wheel spacer drums 33 of the semi-trailer ride over the rail sections 34 and 36, the latter sloping at a moderate downward grade so as to bring the semi-trailer to its retracted position wherein the tires of the semi-trailer are brought to bear against a transverse vertical surface 39 of the car frame. This transverse surface forms one wall of a housing for the mechanism which raises and lowers the platform. Also, the surface is formed with elongated vertical apertures through which the rotatable lever arms 23 project.

The angle defined between the surface of the swinging platform and the horizontal plane, i.e. the slope of track 36 in the lowered position, can assume any convenient value, it being noted that a lower limit for such slope is determined by the wheel base of the railway car. A convenient value for said incline has been found to be a grade of about 13 or 14%. This grade is quite compatible with the weights of the loaded semi-trailers to be driven up or eased down the incline, which weights (rear axle load) are on the order of about 15 metric tons in case of a horizontal draft force of about 2.5 tons. The drive and braking torques required on the basis of the figures just indicated for hoisting the loaded trailers up the inclines and easing them down, respectively, are well within the capacity of conventional tractors.

A procedure usable in loading and unloading semi-trailers on and from flat cars or trucks constructed as described herein will now be described in further detail with reference to FIG. 6. As shown a train of two cars or trucks A and B is positioned endwise adjacent to the loading station platform C and normally thereto, with the cars A and B so oriented that the pivot axes 13 of the respective swinging frames D1 and D2 thereof are directed towards the station platform C. In the illustrated example the car to be loaded is assumed to be the second car B, and it will of course be understood that the car B may be followed by a string of further similar cars all of which have successively been loaded in the same manner as will now be described for car B. Similarly, there may obviously be more than one intervening empty cars such as A between the station C platform and the car B being loaded.

In the car B being loaded the swinging frame D2 is brought to its lowered position while in the intervening empty car or cars such as A the swinging platform is raised. The semi-trailer E is pushed by a tractor F in the direction indicated by the arrow $f$ so that its rear end is directed towards the train, and its wheels G engage a conventional centering or guide device H whereby they are guided upon a loading incline I. The incline I may of course be omitted in cases where the station is provided with a raised loading platform. The trailer wheels then ride over the rail tracks 34, 36 and 37 of the empty car A and over a bridging track section J removably fitted between the adjacent end track portions 37 of car A and 34 of car B. So soon as the wheels G have attained the incline of the swinging frame D2 the tractor driver applies the brakes to retard the descent of the semi-trailer down the incline until the tires of the semi-trailer have engaged the abutment surfaces 39. At this time the body of the semi-trailer is inclined and the tractor driver operates power jack mechanism provided on the tractor for easing the left or front end of the semi-trailer body until a bearing surface 40 on the underside of the trailer body has been brought down to rest on a complementary bearing surface 41 provided on the car platform so that the vehicle is brought to its final loaded condition shown in FIG. 1. The parking prop 42 (FIG. 1) depending from the trailer body extends into the space between side members 9 and 10 to the left of the cross members 11 (FIG. 3). The tractor is now uncoupled from the vehicle and driven back to the station platform. The swinging frame D1 of the next car A to be loaded is then lowered and a similar procedure is followed in respect to car A.

Means will now be described for making the semi-trailer fast to the car on which it is loaded. A vertical king-pin 43 depends from the bearing surface 40 of the trailer and in the position where surface 40 is resting on the car surface 41 the king-pin 43 projects into a longitudinal slot 44 formed in the surface 41. The longitudinal position assumed by pin 43 is of course determined by the abutment of the tires 32 against the surfaces 39 and it will be understood that the slot 44 may be made of substantial length to allow the car to accommodate vehicles of considerably differing lengths. A screw shaft 45 (see FIG. 5) is journalled longitudinally in spaced bearings 50, 51 of the car frame within the slot 44 and is engaged by a nut member 46 which is prevented by suitable guide means from assuming rotational movement. A centering fork member 47 having two transversely spaced tines projects rearwardly from the nut member 46 and is adapted to engage between its tines an annularly grooved portion 48 of the pin 43. By suitably rotating the screw shaft 45 the nut member 46 and fork 47 can be displaced rightward until the pin 43 is firmly engaged against a cushion member 49 of yielding material provided within the end of the fork member, thereby locking the semi-trailer in position regardless of variations in the length dimension of it. Since the rear end of the vehicle is resiliently abutted through its wheel rims it will be realized that the vehicle is effectively cushioned in a longitudinal direction against shocks exerted both forward and rearward. Means for manually rotating screwshaft 45 are shown as comprising a bevel gearing 52—53 and a bevel gearing 55—56 with gears 53 and 55 carried on the ends of a rotatable sleeve 54, and a manual crank arm 58 (FIG. 1) being connected to the shaft 57 of gear 56 by way of a folding joint whereby the crank may be moved to a projecting operative position or a retracted position folded alongside the sidesill 1 of the car.

Means are preferably used for providing a continuous track between the rail sections 36 and 37 and will now be described with reference to FIG. 4. It will be noted that at the moment the tires 32 engage the abutment 39 (FIGURE 1), the trailer is in tilted position shown at 59 in FIGURE 1. This is due to the front end of the trailer being mounted on the tractor. At this moment, the rear bottom end of the body has only small clearance above the surface of the car platform. While it would of course be possible by lessening the depth of the pit in the platform car to provide a construction with sufficient clearance for the trailer body to clear the rails 37, it is preferred according to the present invention, not to lessen the depth of the pit and instead, to cut off the rails 37 somewhat short of the rear end of the opening so that the rails will not be fouled by the trailer body 59. Means are accordingly provided for allowing the trailer to ride upon its tires over the short intervening distance between the adjacent ends of the tracks 36 and 37. As will be noted from FIG. 2 the axle 31 of the trailer as the wheels leave the rail sections 36 suffers a small vertical drop equal to the amount $h$ plus the depth of tire collapse. While this combined amount is quite small, the loaded trailer in riding over a number of empty cars such as A (FIG. 6) during loading and unloading operations would be subjected to a sequence of downward and upward jerks which would be communicated to the tractor and might eventually have detrimental effects, as well as needlessly consuming power. To avoid this there are preferably provided small additional guide ways 61 (FIG. 4) having a total height corresponding to the amount mentioned above and positioned to each side of each of the rails 37 and extending substantially from the rails 37 to the rails 36. The ends of the ways 61 are inclined as shown at 62 and 63 to ensure a smooth transition with the rails.

It will thus be apparent that an improved flat car or goods truck has been provided for the transportation by rail of heavily laden road vehicles of the type having a wheel assembly adjacent one end thereof, such as semi-trailer vehicles, which car combines a number of important advantages. The longitudinal positioning of the vehicle along the car is effected automatically since the tires 32 are brought into and retained in the bottom of the pit V defined between the members 9—10 and abutment 39, by the effect of gravity. Longitudinal impact stresses in one direction (as shown by $f1$ in FIG. 1) are taken up by said abutment and cushioned by the tires of the trailer. Longitudinal impact stresses in the opposite direction are taken up and damped by the wheels of the trailer riding a short distance up the incline in case the mechanism of FIGURE 5 is not adequately tightened. The resilient cushion 49 in the manual coupling system allows the semi-trailer to effect small displacements leftward relative to the car. Friction between the cooperating bearing surfaces 40 and 41 also acts to take up and damp kinetic energy and impacts since in the case of a 13-ton load the opposing force developed by friction would be on the order of 0.2 x 13=2.6 metric tons.

The railway car equipment is thus well protected at all times. Moreover the car itself requires no power equipment whatever but only manually operable mechanism need be provided, and all of the power involved in maneuvering the trails may be concentrated in a single power vehicle such as a tractor forming part of the station equipment.

It has been found that when using the invention the loading and unloading operations can be completed in an extraordinarily short time, it being noted that the manual cranks 20 and 58 can be operated during the back-and-forth trips performed by the tractor.

It will be understood that the invention is not restricted to the specific form of embodiment illustrated and described herein and that various modifications may be made in the construction disclosed. Thus, one desirable modification would consist in so mounting the swinging frame relatively to the car platform that the former can be pivoted about either of its ends, depending on requirements. For this purpose pivot shafts such as 13, but made removable, can be provided at both ends of the car platform opening and cooperate with bearings such as 12 provided at both ends of the side members 9 and 10. Such a provision will facilitate the shunting and marshalling of the trains preparatory to loading operations. Yet other modifications will appear to those familiar with the art.

What we claim is:

1. A railroad car for the transportation of road vehicles having road wheels on each side and adjacent only one end of the vehicle, comprising a platform, a generally rectangular opening in said platform larger in breadth than the transverse dimension between said road wheels, a swinging frame pivoted to said car platform adjacent one end of said platform, means adjacent the other end of said platform for moving said frame between a raised position in which the swinging frame has a substantially flat surface generally coplanar with said car platform and a lowered position in which said swinging frame provides a gradual incline for leading said wheels into and out of said opening from one end of said car to the other, abutment means extending substantially vertically near the end of said opening adjacent the lowered end of said frame, said abutment means being operatively exposed by the lowering of said frame and located for the wheels of said vehicle to abut against it, and means at the opposite end of said vehicle and car resiliently retaining said vehicle on said car against movement in a direction away from said abutment.

2. In a flat car as claimed in claim 1, cross members supported from the platform across the opening below the platform and engageable by the frame when in lowered position at a point on the frame intermediate the ends of the inclined portion thereof.

3. A flat car as claimed in claim 1 having at least one linkage means comprising a pair of interpivoted links having their free ends respectively pivoted to a side of the frame and to a side of said platform and operable on movement of the frame between its said positions for supporting the frame when in lowered position intermediate the ends of its inclined portion.

4. In a flat car for shipping a vehicle, a platform having wheels at each end, a generally rectangular opening therein extending substantially the distance between said wheels, a frame, means pivoting one end of the frame to the platform adjacent one end of the opening, means for swinging the frame between a raised position substantially coplanar with the platform and a lowered position in which the frame extends at a downward angle from said one end of the opening to a point adjacent to and spaced below the other end thereof providing a gradual incline for leading the wheels of said vehicle into and out of said opening from one end of said car to the other, longitudinal rails on the platform at each end of the car, and rails on the frame aligned in raised position of the frame with said longitudinal rails, the rails on the platform adjacent the depressible end of the frame being short of the end of the platform opening, and guideways of less height than the said shorter rails and aligned therewith between the platform opening and said shorter rails.

5. A railroad car for the transportation of road vehicles having road wheels on each side and adjacent only one end of the vehicle, comprising a platform, a generally rectangular opening in said platform larger in breadth than the transverse dimension between said road wheels, a swinging frame pivoted to said car platform adjacent one end of said platform, means adjacent the other end of said platform for moving said frame between a raised position in which the swinging frame has a substantially flat surface generally coplanar with said car platform and a lowered position in which said swinging frame provides a gradual incline for leading said wheels into and out of said opening from one end of said car to the other, and a housing for said raising and lowering means, one wall of said housing becoming exposed on lowering of said frame and providing an abutment for the wheels of the road vehicle.

References Cited in the file of this patent

UNITED STATES PATENTS

| | | |
|---|---|---|
| 2,099,288 | Allen | Nov. 16, 1937 |
| 2,135,307 | Keator | Nov. 1, 1938 |
| 2,144,081 | Porte | Jan. 17, 1939 |
| 2,305,444 | Pond | Dec. 15, 1942 |
| 2,373,148 | Smith | Apr. 10, 1945 |
| 2,585,126 | Holland | Feb. 12, 1952 |
| 2,587,456 | Francis | Feb. 26, 1952 |
| 2,605,007 | Gaynor | July 29, 1952 |
| 2,668,734 | Bridge | Feb. 9, 1954 |
| 2,837,037 | Holmberg | June 3, 1958 |
| 2,851,963 | Sheehan | Sept. 16, 1958 |
| 2,914,003 | Seel et al. | Nov. 24, 1959 |